US008453512B2

(12) United States Patent
Sasso et al.

(10) Patent No.: US 8,453,512 B2
(45) Date of Patent: Jun. 4, 2013

(54) HIGH-FREQUENCY, HEXAPOD SIX DEGREE-OF-FREEDOM SHAKER

(75) Inventors: Felix T. Sasso, Los Angeles, CA (US); Walter H. Chung, Rancho Palos Verdes, CA (US); John A. L. Shishido, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 351 days.

(21) Appl. No.: 12/802,949

(22) Filed: Jun. 17, 2010

(65) Prior Publication Data

US 2011/0308296 A1  Dec. 22, 2011

(51) Int. Cl.
*B06B 3/00* (2006.01)

(52) U.S. Cl.
USPC .................................. 73/668; 73/663; 73/666

(58) Field of Classification Search
USPC ........... 73/1.77, 662–668, 849, 856; 248/550, 248/559, 562, 630, 636, 644, 638, 136; 702/43, 702/75, 2, 4
See application file for complete search history.

(56) References Cited

U.S. PATENT DOCUMENTS

| 4,181,029 | A | 1/1980 | Talbott, Jr. | |
|---|---|---|---|---|
| 5,343,752 | A | 9/1994 | Woyski et al. | |
| 5,365,788 | A | 11/1994 | Hobbs | |
| 5,594,177 | A | 1/1997 | Hanse | |
| 6,105,433 | A | 8/2000 | Hess | |
| 6,860,152 | B2 | 3/2005 | Lund et al. | |
| 7,320,455 | B2 * | 1/2008 | Ryaboy et al. | 248/638 |
| 7,965,001 | B2 * | 6/2011 | Aoyama et al. | 310/36 |
| 8,061,677 | B2 * | 11/2011 | Johnson et al. | 248/550 |
| 8,162,299 | B2 * | 4/2012 | Hiley et al. | 267/136 |
| 2007/0113657 | A1 * | 5/2007 | Hammond et al. | 73/663 |
| 2008/0191118 | A1 * | 8/2008 | Johnson et al. | 248/638 |
| 2012/0091828 | A1 * | 4/2012 | Despesse | 310/19 |

FOREIGN PATENT DOCUMENTS

JP 04006434 A * 1/1992

OTHER PUBLICATIONS

Coninck et al., "Increasing the accuracy of MDOF road reproduction experiments: calibration, tuning and a modified TWR approach," Proceedings of ISMA (2004), 709-722.
"Simulation Table: Next Generation Testing," Moog Inc. (2009).
Berstein, "A Six-Degree-of-Freedom Shaker Table, Active Isolator, and Gimbaled Stage for Research in Precision Motion Control and Target Tracking," 2002.
International Search Report for International Application No. PCT/US2011/037593 dated Feb. 3, 2012, 4 pages.

(Continued)

*Primary Examiner* — Hezron E Williams
*Assistant Examiner* — Nashmiya Fayyaz
(74) *Attorney, Agent, or Firm* — K & L Gates LLP

(57) ABSTRACT

A shaker for enabling the testing of gyros and/or other devices for performance under realistic 6DOF motions. The shaker may be implemented as a hexapod, comprising a plate and six individually, simultaneously, and real-time controllable strut assemblies that are capable of extending and contracting linearly. The strut assemblies may comprise high-precision, linear electromagnetic actuators. The strut assemblies may also comprise high-precision non-contact sensors to sense the extension/contraction of the strut assemblies along their stroke length. In addition, the strut assemblies may comprise, at each end thereof, stiff, bendable flexures to attain the repeatable and linear motion required. The controller preferably has a control bandwidth of 1000 Hz or more, so that the motion of the plate can be precisely controlled to realize realistic 6DOF motions.

20 Claims, 14 Drawing Sheets

OTHER PUBLICATIONS

Written Opinion of the International Searching Authority for International Application No. PCT/US2011/037593 dated Feb. 3, 2012, 9 pages.

dSPACE Catalog 2009, "DS1103 PPC Controller Board, Powerful controller board for rapid control prototyping", Jan. 1, 2009, pp. 326-331.

* cited by examiner

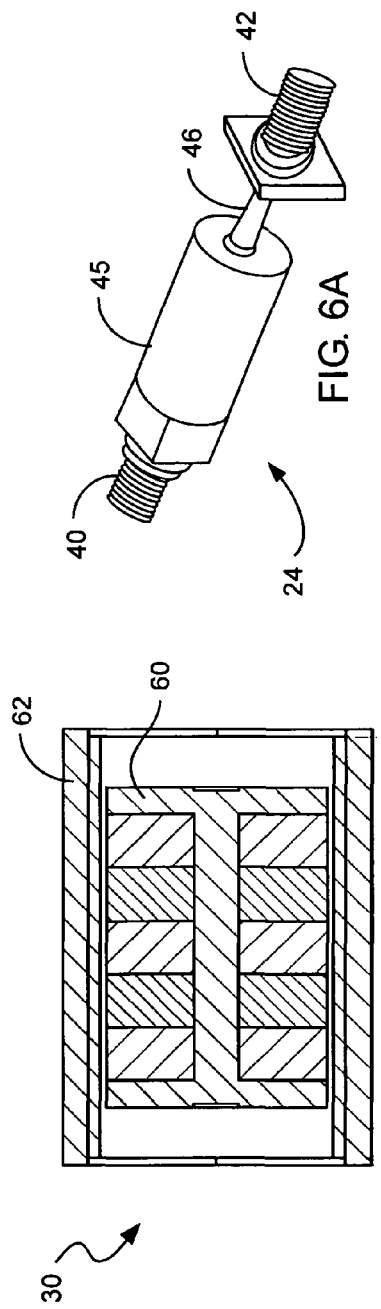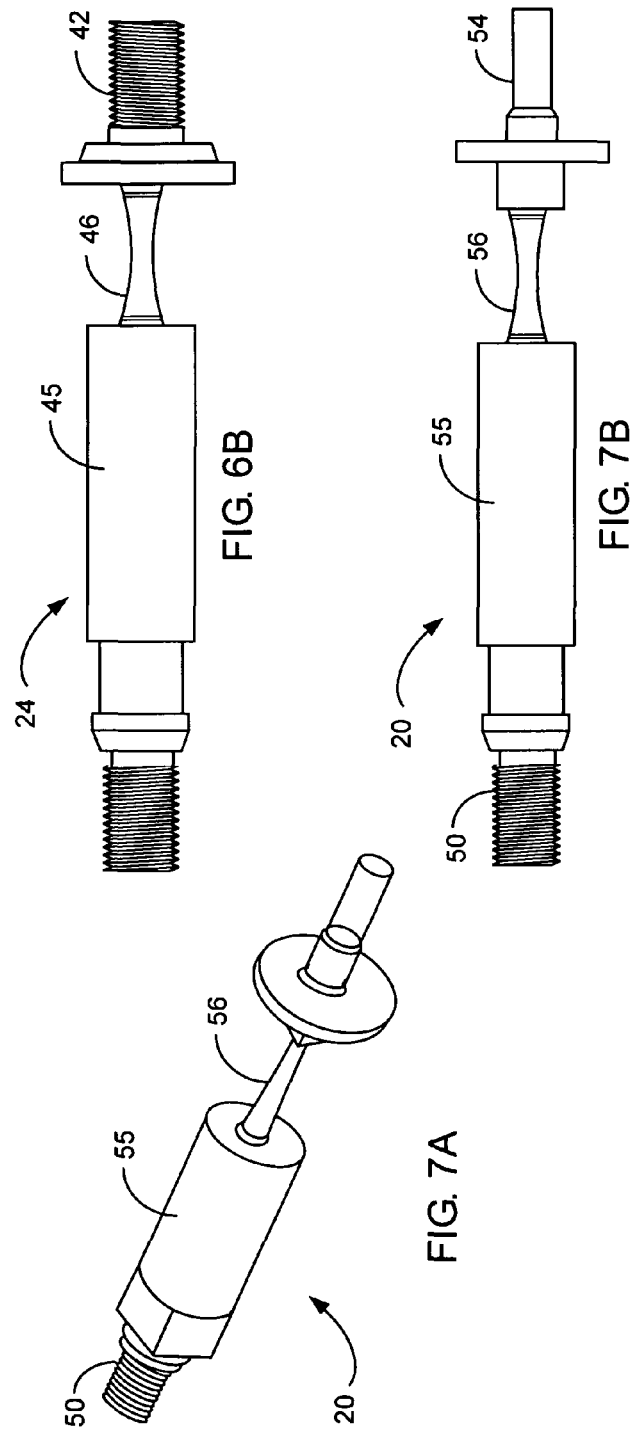

HIGH-FREQUENCY, HEXAPOD SIX DEGREE-OF-FREEDOM SHAKER

STATEMENT REGARDING GOVERNMENT INTEREST

This invention was made with government support under Contract No. FA8802-04-C-0001 awarded by the Department of the Air Force. The government has certain rights in the invention.

BACKGROUND

State-of-the-art gyroscopes ("gyros") for space and other applications require realistic laboratory environments to test and characterize performance. Realistic environments cover a range of frequencies consistent with control moment gyros, gimbals, motors, thruster events, etc. They require controlled, repeatable mechanical excitation of the gyro over six degrees of freedom ("6DOF") simultaneously, just as the device would be exposed to in space. In particular, one popular type of gyro for space applications are fiber optic gyros (FOGs), which have recently been found to be susceptible to low level vibration. This effect manifests itself as abrupt shifts in bias, which can be detrimental to operations. This phenomenon was not identified using standard gyro test techniques and has been shown to be extremely nonlinear.

SUMMARY

In one general aspect, the present invention is directed to a shaker for enabling the testing of gyros and/or other devices for performance under realistic 6DOF motions, e.g., spacecraft motions. In various embodiments, the shaker may be implemented as a hexapod, comprising of a top plate and six (6) individually and simultaneously controllable strut assemblies that are capable of extending and contracting linearly. The strut assemblies can be individually and simultaneously controlled by a closed-loop, programmable controller to enable the plate to move linearly in all three directions and/or to rotate about all three axes. The strut assemblies may comprise high-precision, linear electromagnetic actuators, such as voice coil actuators. The strut assemblies may also comprise high-precision non-contact sensors to sense the extension/contraction of the strut assemblies along their stroke length. In addition, the strut assemblies may comprise, at each end thereof, stiff, bendable flexures to attain the repeatable and linear motion required. The controller preferably has a control bandwidth of 1000 Hz or more, so that the motion of the plate can be precisely controlled (e.g., 20 nm or less resolution) at high frequencies, such as the high frequencies seen in known spacecraft environments.

FIGURES

Various embodiments of the present invention are described herein in conjunction with the following figures, wherein:

FIG. 5 is a cross-sectional view of the voice coil actuator (VCA) of the strut assembly according to various embodiments of the present invention;

FIGS. 6A-6B and 7A-7B are diagrams of the flexures of the strut assemblies according to various embodiments of the present invention;

Figure 11A:
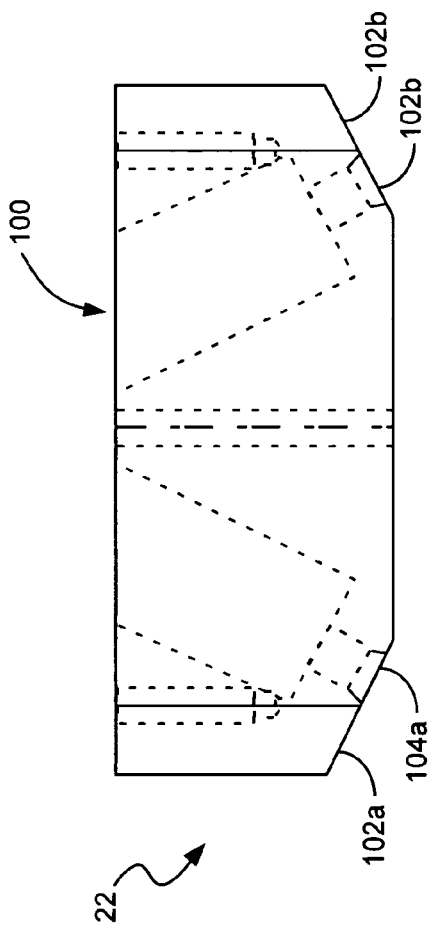
Figure 11B:
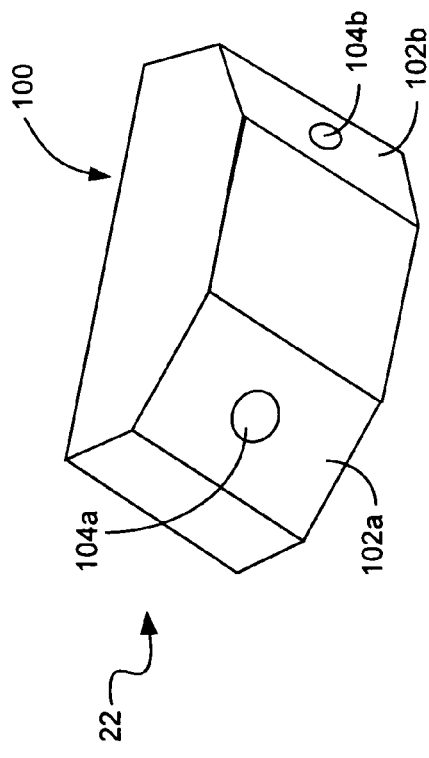
Figure 12:
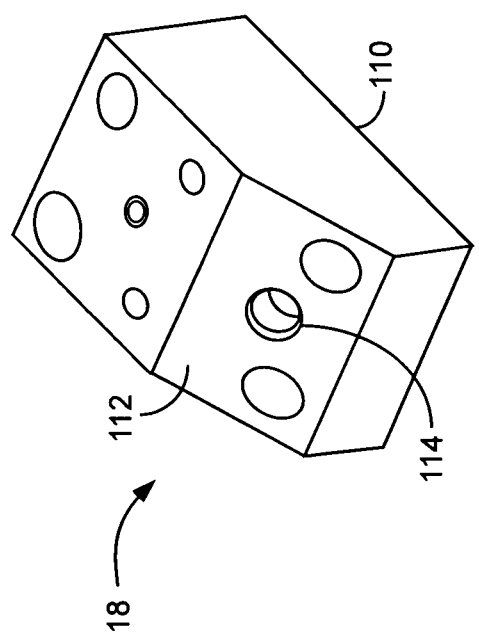

FIGS. 11A-B are diagrams illustrating an upper bipod block according to various embodiments of the present invention;

FIG. 12 is a diagram illustrating a base for a strut assembly according to various embodiments of the present invention;

FIG. 13A-C and 14 are diagrams illustrating the shaker top plate according to various embodiments of the present invention; and FIGS. 15-19 illustrate a process of assembling the shaker according to various embodiments of the present invention.

DESCRIPTION

Figure 1:
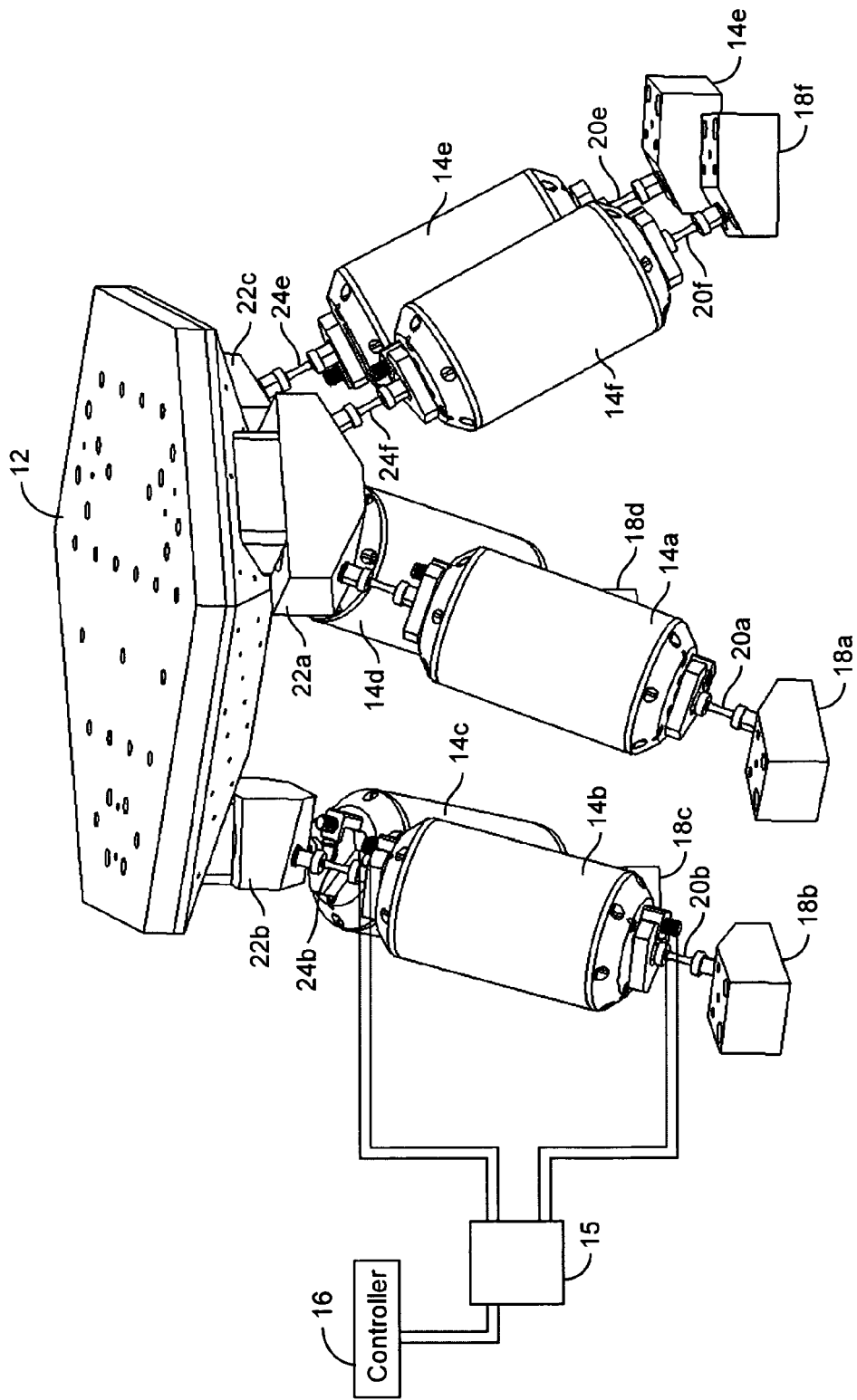
FIG. 1 is a diagram of a 6DOF shaker according to various embodiments of the present invention.

FIG. 1 is a diagram of a 6DOF shaker 10 according to various embodiments of the present invention. As shown in FIG. 1, the shaker 10 may comprise a top plate 12, a plurality of (e.g., six (6)) strut assemblies 14a-f, and a real-time, closed-loop controller 16. Each of the strut assemblies 14a-f has an upper end connected to the plate 12. As described further below, each of the strut assemblies 14 may comprise a linear actuator that causes the strut assemblies to extend or contract linearly along a linear stroke length based on strut extension control signals from the real-time, closed-loop controller 16. The real-time, closed-loop controller 16 may be electrically connected (such as by cables) to each of the strut assemblies 14a-f and may control each of the strut assemblies 14a-f individually, although in FIG. 1 the real-time, closed-loop controller 16 is shown as being electrically connected to a single strut assembly (strut assembly 14a) for convenience. Each strut assembly 14a-f may comprise one or more position sensors (e.g., non-contact position sensors) that determine the real-time position (e.g., amount of linear displacement) of the strut assembly 14a-f along its linear stroke length. The one or more position sensors may be connected to the controller 16 via sensor electronics 15. Based on the feedback from the position sensors, the real-time, closed-loop controller 16 determines and outputs the appropriate strut extension control signals for the actuators of the individual strut assemblies 14a-f. There may be a separate sensor electronics unit 15 for each strut assembly 14, or groups of sensor electronics units may be combined.

Figure 1A:
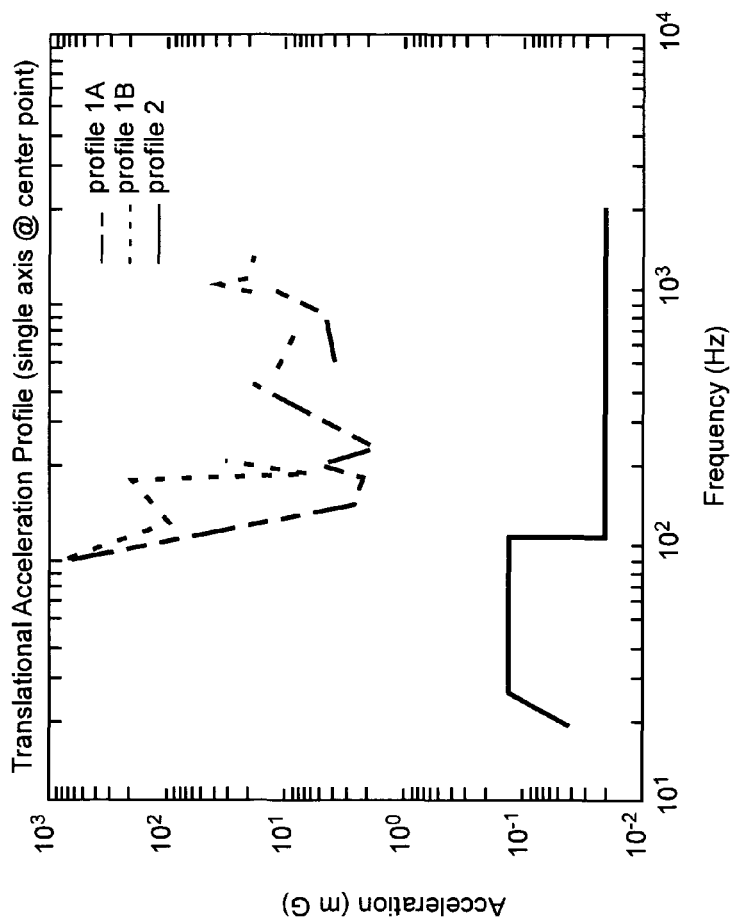
FIG. 1A shows a linear acceleration spectrum for the z-axis for two different motion programs according to various embodiments of the present invention.

By individually and simultaneously controlling the stroke position of each of the strut assemblies 14a-f along their stroke length, the real-time, closed-loop controller 16 can cause the top plate 12 to realize a desired motion path with six degrees of freedom and with high-resolution (within 20 nm or less, and preferably within 10 nm). Rotational motion is enabled, for example, by commanding different strut lengths simultaneously. As explained further below, the real-time, closed-loop controller 16 may have a control bandwidth greater than or equal to 1000 Hz, and preferably greater than 1500 Hz. That way, the motion of the plate 12 can be precisely controlled (e.g., 10 nm resolution) to realize realistic 6DOF spacecraft motions. Consequently, the shaker 10 can be used to test the response of sensors placed on the top plate 12, such as a FOG, for example. For example, the objective of the shaker 10 may be to transmit power to a unit under test, e.g., a FOG, across a set of discrete frequencies for all six DOFs simultaneously. FIG. 1A shows the required linear acceleration spectrum for the z-axis for two different motion programs (there are three plots in FIG. 1A because one of the programs had two profiles, denoted 1A and 1B respectively).

As shown in the example of FIG. 1, each strut assembly 14a-f may have a lower end connected to a base (or foot) 18a-f by a lower flexure 20a-f. In addition, pairs of strut assemblies 14a-f may be connected respectively by upper flexures 24a-f to upper bipod blocks 22a-c. The upper bipod blocks 22a-c in turn are connected to the plate 12 (such as a lower surface thereof) to thereby connect the strut assemblies 14a-f to the plate 12. For example, as shown in the example of FIG. 1, strut assemblies 14a, 14f may be mounted to upper bipod block 22a, strut assemblies 14b, 14c may be mounted to upper bipod block 22b, and strut assemblies 14d, 14e may be mounted to upper bipod block 22c.

Figure 2:
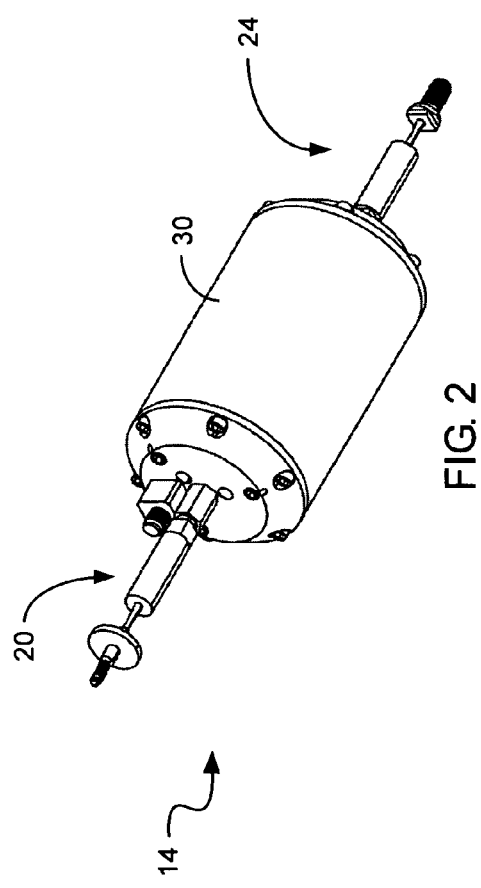
FIG. 2 is a diagram of an assembled strut assembly according to various embodiments of the present invention.
Figure 3:
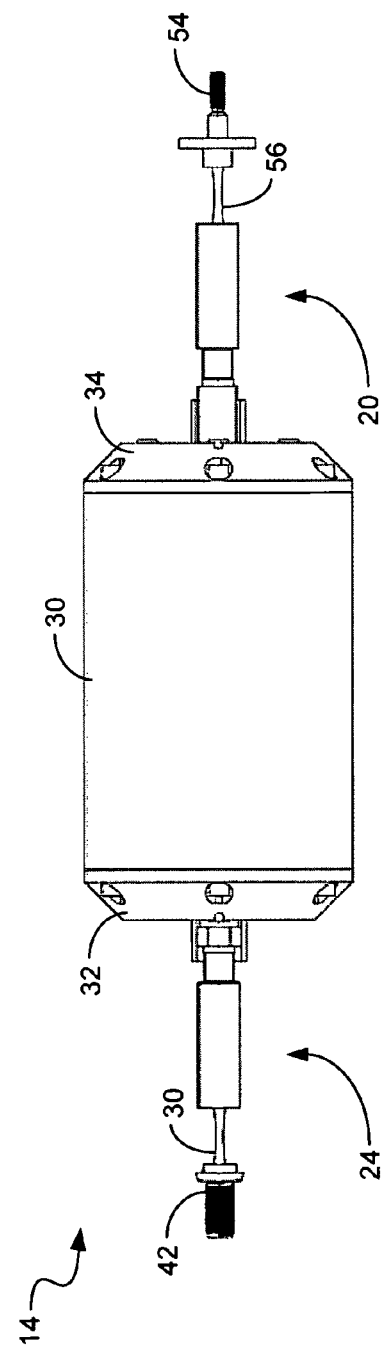
FIG. 3 is a side view of the strut assembly according to various embodiments of the present invention.
Figure 4:
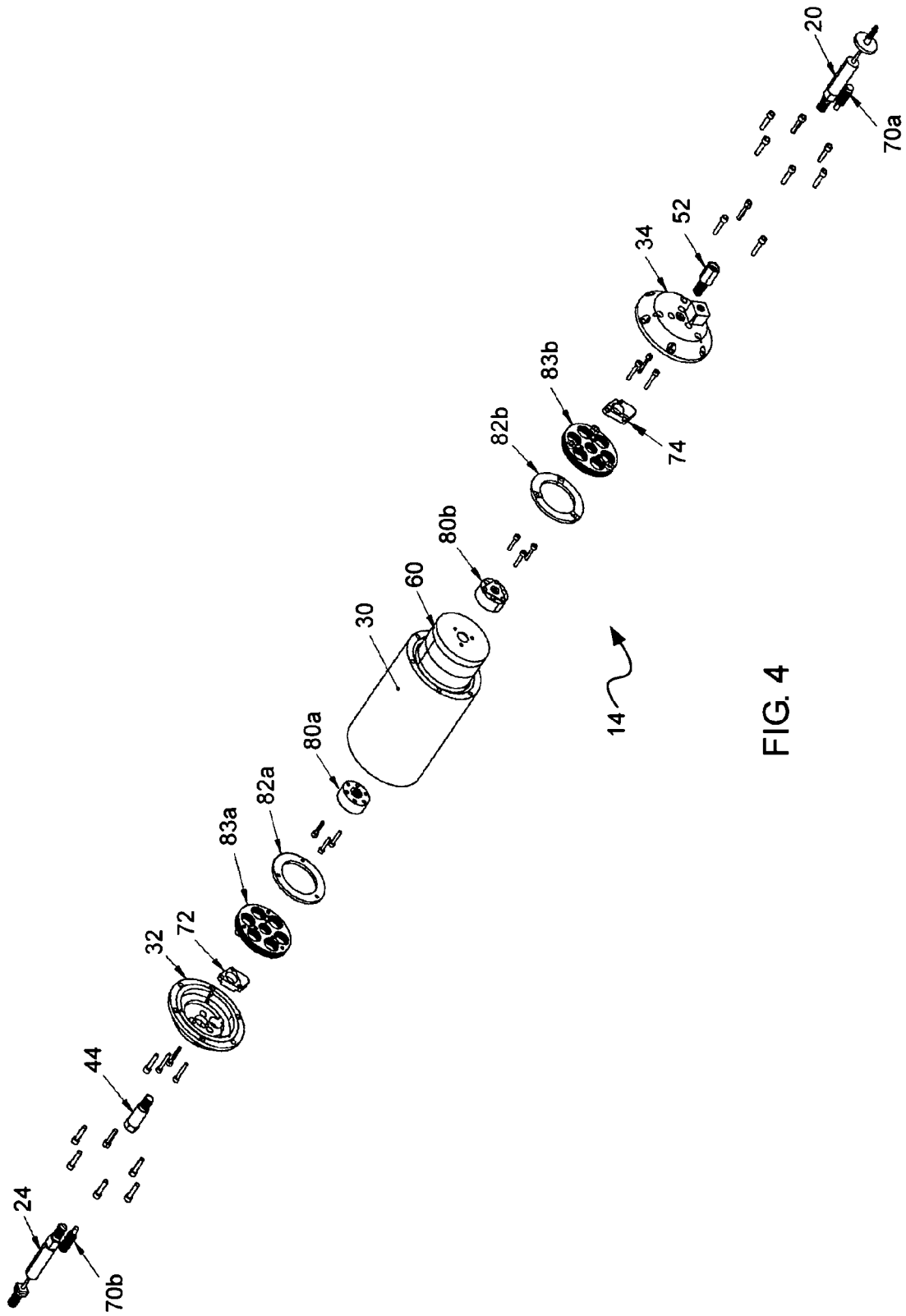
FIG. 4 is an exploded view of the strut assembly according to various embodiments of the present invention.

As mentioned above, each strut assembly 14a-f may comprise (i) a linear actuator for causing the strut assembly to extend or contract along a linear stroke length, and (ii) one or more position sensors that measure the position (e.g., linear displacement) of the strut along the linear stroke length. Preferably, in order to achieve the desired high control bandwidths (e.g., greater than or equal to 1000 Hz), the linear actuator comprises an electromagnetic actuator, such as a voice coil actuator (VCA), and the position sensor(s) comprises a high-precision non-contact position sensor to sense the linear position of the strut assembly along its stroke length. The position sensors may have a resolution of, for example, 2 nm or less, and preferably 1 nm or less. FIGS. 2-5 show aspects of a strut assembly 14 that comprises a VCA 30 and two non-contact position sensors according to various embodiments of the present invention: FIG. 2 is a diagram of an assembled strut assembly 14; FIG. 3 is a side view of the strut assembly 14; FIG. 4 is an exploded view of the strut assembly 14; and FIG. 5 is a cross-sectional view of the voice coil actuator (VCA) 30. Preferably, each of the strut assemblies 14a-f is identically constructed.

As shown in FIGS. 2-5, the VCA 30 of the strut assembly 14 may comprise an upper cap 32 at an upper end of the VCA 40 and a lower cap 34 at a lower end of the VCA 30. The end caps 32, 34 may be made from metal, such as stainless steel, for example. The upper flexure 24 may be connected to (e.g., screwed into) the upper cap 32 of the VCA 30 and the lower flexure 20 may be connected to (e.g., screwed into) the lower cap 34 of the VCA 30. FIGS. 6A-B and 7A-B are diagrams of the upper and lower flexures 20, 24 respectively according to various embodiments. Preferably, each of the upper flexures 24a-f are identical and each of the lower flexures 20a-f are identical. In addition, the upper flexures 24a-f and the lower flexures 20a-f preferably comprise metal, such as stainless steel. As shown in FIGS. 6A-B, the upper flexure 24 comprises a first threaded end portion 40 that may be connected to the upper cap 32 of the VCA 30. As shown in FIG. 4, an upper threaded adapter 44 may be used to connect the first threaded end portion 40 of the upper flexure 24 to the upper cap 32 of the VCA 30. The upper flexure 24 also comprises a second threaded end portion 42 that is used to bolt the upper flexure 24 to the upper bipod block 22 for the strut assembly 14. In between the first and second threaded end portions 40, 42, the flexure 24 may comprise a thick portion 45 and a flexible, stiff, thinner stem portion 46, the stem portion 46 capable of being repeatedly flexed and bent due to extension/contraction of the strut assembly 14. Preferably, the flexible stem portion 46 is made of a flexible metal with the stem portion having a circular cross-section along the length thereof. The diameter of the stem portion 46 may be uniform along its length or the diameter of the stem portion 42 may vary along its length (e.g., the stem portion 46 may have a parabolic longitudinal cross-section). Preferably, at its thinnest, the stem portion has a diameter of ⅛ inch or less, although the thickness and taper of the stem portion 46 may vary in other embodiments.

The lower flexure 20, as shown in FIGS. 7A-B, may comprise a first threaded portion 50 that is connected to the lower cap 34 of the VCA 30. As shown in FIG. 4, a lower threaded adapter 52 may be used to connect the first threaded end portion 50 of the lower flexure 20 to the lower cap 34 of the VCA 30. The lower flexure 20 also comprises a second end portion 52 that is connected to the base 18 for the strut assembly 14. In between the first and second end portions 50, 54, the lower flexure 20 comprises a thick portion and a thinner flexible stem portion 56 that is capable of being repeatedly flexed and bent due to extension/contraction of the strut assembly 14. The flexible stem portion 56 of the lower flexure 20 may be similar in construction to the stem portion 46 of the upper flexure 20.

As shown in FIGS. 4-5, the VCA 30 may comprise a non-commutated moving magnet-type linear VCA that comprises an inner magnet 60 and an outer housing 62. The inner magnet 60 moves linearly within the outer housing 62 along a stroke length based on current in a coil (not shown) in the outer housing 62 surrounding the inner magnet 60. The stroke length may be less than one (1) inch, preferably less than 0.20 inches, and more preferably less than 0.10 inches, such as 0.06 inches in various embodiments. The radial clearance between the inner magnet 60 and the outer housing 62 preferably is on the order of hundredths of inches, such as 0.01 inches in various embodiments. The coil may be energized with an analog strut control signal from the controller 16, where the magnitude and polarity of the voltage of the analog extension control signal determines the extent of extension or contraction of the strut assembly 14 (e.g., whether the inner magnet 60 linearly translates out of the housing 62 (extension) or whether the inner magnet 60 linearly translates into the housing 62 (contraction)). The controller 16 may comprise, for example, a digital-to-analog converter (DAC) to convert a digital strut extension control signal determined by the controller based on feedback from the position sensors to analog for supplying to and controlling the VCA 30. The sensor electronics units 15 may comprise amplifiers for amplifying the analog control signals for the different strut assemblies 14a-f. The DACs for converting the digital strut extension control signals to analog may also be part of the sensor electronics units 15. In other embodiments, different types of linear electromagnetic actuators may be used, such as, for example, moving-coil linear VCAs, etc.

The strut assembly 14 may also comprise one or more position sensors for sensing the position of the strut assembly 14 along its stroke length, e.g., the extent to which the inner magnet 60 of the VCA is extended from or contracted into the outer housing 62. Outputs of the one or more position sensors are input as feedback to the controller 16, which determines the strut extension control signal for the VCA therefrom. Preferably, the one or more position sensors are non-contact, high-precision (e.g., 2 nm resolution or better) position sensors, such as eddy current sensors, capacitive sensors, optical encoders, or any other suitable type of non-contact, high-precision position sensor. In the embodiment shown in FIG. 4, the strut assembly comprises two (2) eddy current non-contact position sensors 70a-b. Position sensor 70a is attached (e.g., screwed into) to a lower end cap 34 and moves with the inner magnet 60 of the VCA. The position sensor 70a measures its distance from an electrically-conductive (e.g., aluminum alloy) target 74. The target 74 may be positioned between the lower cap 34 and the outer housing 62 of the VCA 30. Consequently, when the VCA 30 is actuated, there is relative linear movement between the position sensor 70a and the target 74, with the linear distance between the position sensor 70a and the upper target 74 being sensed by the position sensor 70a and output to the controller 16. The particular sensor used in this embodiment is a differential sensor and so the strut assembly 14 requires a second position sensor 70b, which senses the relative linear movement between the position sensor 70b and another electrically-conductive (e.g., aluminum alloy) target 72 that is positioned between the upper cap 32 and the VCA 30, as shown in FIG. 4. In various embodiments, dynamic differential sensing (DDS) eddy current position sensors from Blue Line Engineering, Inc., Colorado Springs, Colo. may be used for the positions sensors 70. In other embodiments, Mercury II™ optical encoders from MicroE Systems, Bedford, Mass., may be used for the position sensors.

As shown in FIG. 4, in various embodiments the strut assembly 14 may comprise various other components for assembling the strut assembly 14, such as and including: upper and lower triangular spacers 80a-b, upper and lower retainer rings 82a-b, upper and lower flexure leaves 83a-b, and upper and lower circular spacers 84a-b. The various components of the strut assembly 14 may be fastened and assembled with screws, as shown in FIG. 4 in various embodiments.

The real-time programmable controller 16 receives the inputs from the position sensor(s) 70 of the strut assemblies 14a-f and, based thereon, computes respective strut extension control signals for each of the strut assemblies 14a-f in a closed-loop fashion to thereby control the extension/contraction of the strut assemblies 14a-f along their respective stroke lengths, to thereby control the 6DOF motion of the shaker top plate 12. The controller 16 may be implemented with one or more programmable circuits, such as, for example, one or more high-performance field programmable gate arrays (FPGA). In other embodiments, other programmable circuits may be used, such as a complex programmable logic device (CPLD), an application specific integrated circuit (ASIC), a programmable system on chip (SOC), a microcontroller, a programmable microprocessor, etc. The desired motion path may be programmed into the controller 16.

The controller 16 operates in real-time with a relatively high closed-loop control bandwidth (e.g., greater than 1000 Hz, and preferably greater than 1500 Hz) so that the motion of the top plate 12 can be controlled with high resolution (e.g., within 20 nm or less, and preferably within 10 nm). A difficulty in realizing such a controller is that there is strong dynamic cross-coupling in the strut assemblies 14, especially for strut assemblies 14 connected to the same upper bipod block (such as struts 14a and 14f, connected to upper bipod block 22a). For example, the position sensors 70 of one strut assembly 14 are sensitive to actuation of other strut assemblies 14. In various embodiments, the controller 16 may be designed using $H_\infty$ (or "H-infinity") mixed sensitivity synthesis. More details about $H_\infty$ methods used in control theory may be found in S. Skogestad and I. Postlethwaite, *Multivariable Feedback Control: Analysis and Design*, 2nd ed., Wiley (2005), which is incorporated herein by reference in its entirety.

The VCAs 30 can be idealized as an inductor in series with a resistor driven by an input voltage V and a back EMF (electromotive force) term $K_b\dot{x}$:

$$L\frac{di}{dt} + Ri = V - K_b\dot{x} \qquad \text{Eq. (1)}$$

where L and R are the inductance and resistance respectively of the VCA 30 and x represents the velocity of the coil. The $\dot{x}$ term is what couples the VCA model to the structural model for the shaker 10. The output of the VCA 30, which is the force that it generates, may be determined by the solution i to Eq. (1) after it is scaled by the motor constant $K_A$, or:

$$lb_f = K_A i \qquad \text{Eq. (2)}$$

Figure 8:
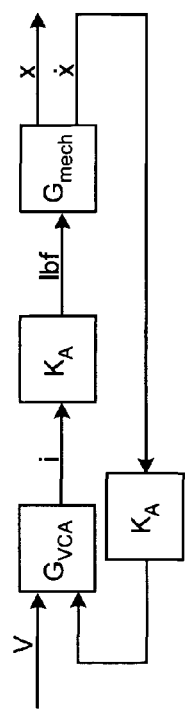
FIG. 8 is a block diagram of the plant transfer function according to various embodiments of the present invention.

The structural model for the shaker 10 may be obtained by finite-element analysis. In one embodiment, the finite-element analysis may consist of 1,629,479 nodes and 996,670 elements. The structural model preferably includes almost all of the mechanical components, as well as the layers of adhesive (e.g., epoxy) used in construction of the top plate 12 (described further below). An example block diagram of the plant model for the shaker 10 is shown in FIG. 8. This model has six inputs (voltage commands to the VCAs) and six outputs (voltages read from the fine position sensors). The six linear VCAs were approximated as transconductive gains. The full structural plant may contain hundreds of modes, many of them superfluous due to minimal mass participation or unobservability. A balanced truncation may be used to reduce the full plant down to a reasonable size. The number of states in the reduced model may be chosen to capture the major structural dynamics of the system. Further reduction may be necessary for the controller design.

Figure 9:
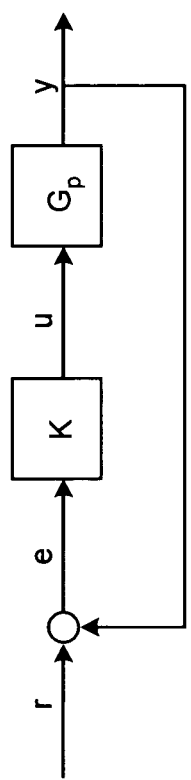
FIG. 9 is a closed-loop block diagram for the controller according to various embodiments of the present invention.

The model discussed above (and depicted in FIG. 8) may be lumped into a transfer function matrix $G_p(s)$. The transfer function $K(s)$ of the controller, shown in FIG. 9, must result in a stable closed-loop system and preferably meets the desired performance objectives (e.g., control bandwidth, resolution). In one embodiment, the $H_\infty$ controller 16 is designed using the following functions for the augmented plant:

$$S(s) = (I - G_p K)^{-1}$$

$$T(s) = G_p K (I - G_p K)^{-1}$$

$$R(s) = K (I - G_p K)^{-1}$$

where $S(s)$ is the sensitivity function and is equivalent to the transfer function between a command input and the error signal, which is the difference between the command input and the measured output. It also measures the response of the system to disturbance inputs. $T(s)$ is the complementary sensitivity function, because $T(s) + S(s) = I$ identically. $T(s)$ is also the closed-loop transfer function matrix of the system.

The $H_\infty$ controller may be determined by finding the controller $K(s)$ that minimizes the infinity-norm of the weighted augmented plant, i.e.:

$$\left\| \begin{array}{c} W_1(s) S(s) \\ W_2(s) R(s) \\ W_3(s) T(s) \end{array} \right\|_\infty$$

The functions $W_1(s)$, $W_2(s)$, and $W_3(s)$ are frequency dependent weighting functions that the control designer may use to shape the response of the system to meet the requirements.

Figure 10:
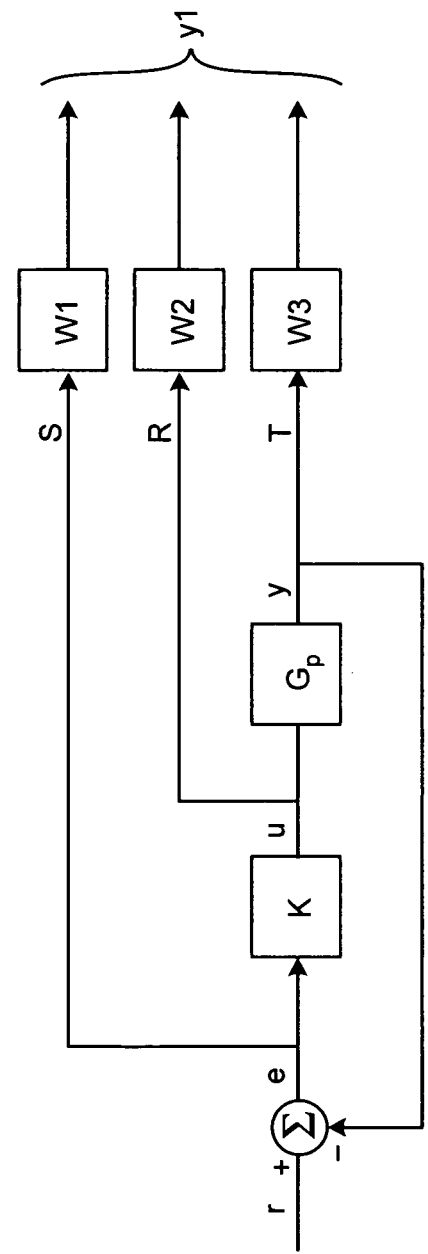
FIG. 10 is block diagram of the augmented plant with weightings according to various embodiments of the present invention.

That is, they influence where in the frequency band the respective functions are to have a small response and where they may have a large response. For design purposes, S(s) must be weighted, but R(s) or T(s) can be unweighted, i.e., W2=W3=1 at all frequencies. The augmented plant with weights is shown in FIG. 10.

$H_\infty$ design approaches have reached a state of maturity where turnkey tools exist for their design, including a pair of MATLAB toolboxes. One of these, the Robust Control Toolbox, was used for this problem in an embodiment and it implements a set of state-space formulae published in Keith Glover and John C. Doyle, "State-space formulae for all stabilizing controllers that satisfy an h-infinity-norm bound and relations to risk sensitivity," Systems & Control Letters, 11:167-172, 1988, which is incorporated herein by reference. The designer need only to provide weighting functions. In various embodiments, weighting the complementary sensitivity T(s) may result in prohibitively high control effort, so R(s) may be weighted instead. Weighting R(s) preferably keeps the control effort at reasonable levels and below the saturation limits of the amplifiers.

A first-order weighting function can be obtained by using a Robust control toolbox function that returns:

$$W(s) = \frac{g_\infty s + \frac{g_0 \omega_0}{g_\infty}\sqrt{\frac{g_\infty^2 - 1}{1 - g_0}}}{s + g_0 \sqrt{\frac{g_\infty^2 - 1}{1 - g_0}}}$$

where the parameter $g_\infty$ is the gain at high frequencies, $g_0$ is the gain at DC, and $\omega_0$ is the desired corner frequency. This last parameter, $\omega_0$, is what the designer can use to set the bandwidth of the controller 16. These parameters may be set systematically or through trial-and-error. Systematic approaches for setting these parameters may be found in Peter Lundstrom, Sigurd Skogestad, and Zi-Qin Wang, "Performance weight selection for h-infinity and μ-control methods," Transactions of the Institute of Measurement and Control, 1991, which is incorporated herein by reference.

In other embodiments, a Linear Quadratic Controller (LQC) controller 16 may be used. LQC is often referred to as $H_2$ because it uses a 2-norm as opposed to an infinity norm in defining its performance objective. The transfer function K(s) of the LQC controller minimizes the 2-norm of the transfer function between a set of disturbances and a specified output. The original formulation of the problem, however, was as a classical quadratic minimization problem of finding a control signal u that minimized the weighted quadratic cost function $$J = \int x^T Q_x + u^T R u \, dt$$

where x is determined by the linear system:

$$\dot{x} = Fx + Gu$$

$$z = Hx + v$$

In various embodiments, the solution turns out to be a series connection between a Kalman filter to estimate x and a Linear Quadratic Regulator solution to derive the control signal as a linear gain on this estimate:

$$u = L\hat{x}$$

The designer is left with the task of choosing weighting matrices for the optimization problem.

FIGS. 11A-11B are diagrams of one of the upper bipod blocks 22 according to various embodiments of the present invention. As shown in FIGS. 11A-B, the upper bipod block 22 comprises a top surface 100 that connects to the underside of the top plate 12. The illustrated upper bipod block 22 also comprises two inclined lower surfaces 102A-B. The two upper flexures 24 of the two strut assemblies mounted to the upper bipod block 22 may be inserted into bores 104A-B respectively of the upper bipod block 22. Nuts from the back side may then be used to bolt the threaded upper flexures 24 to the upper bipod block 22. The upper bipod blocks 22 may be fabricated from metal, such as stainless steel, for example.

FIG. 12 is a diagram of one of the bases 18 according to various embodiments of the present invention. The base 18 may comprise a lower flat surface 110 that rests on the floor or other base surface on which the shaker 10 is situated. As shown in FIG. 12, the base 18 may comprise an upper inclined surface 112 comprising a bore 114. The lower flexure 20 of the strut assembly 14 connected to the base 18 may be inserted into the bore 114. A nut from the back side may then be used to bolt the threaded lower flexure 20 to the base 18. The bases 18 may be fabricated from metal, such as stainless steel, for example.

Figure 13:
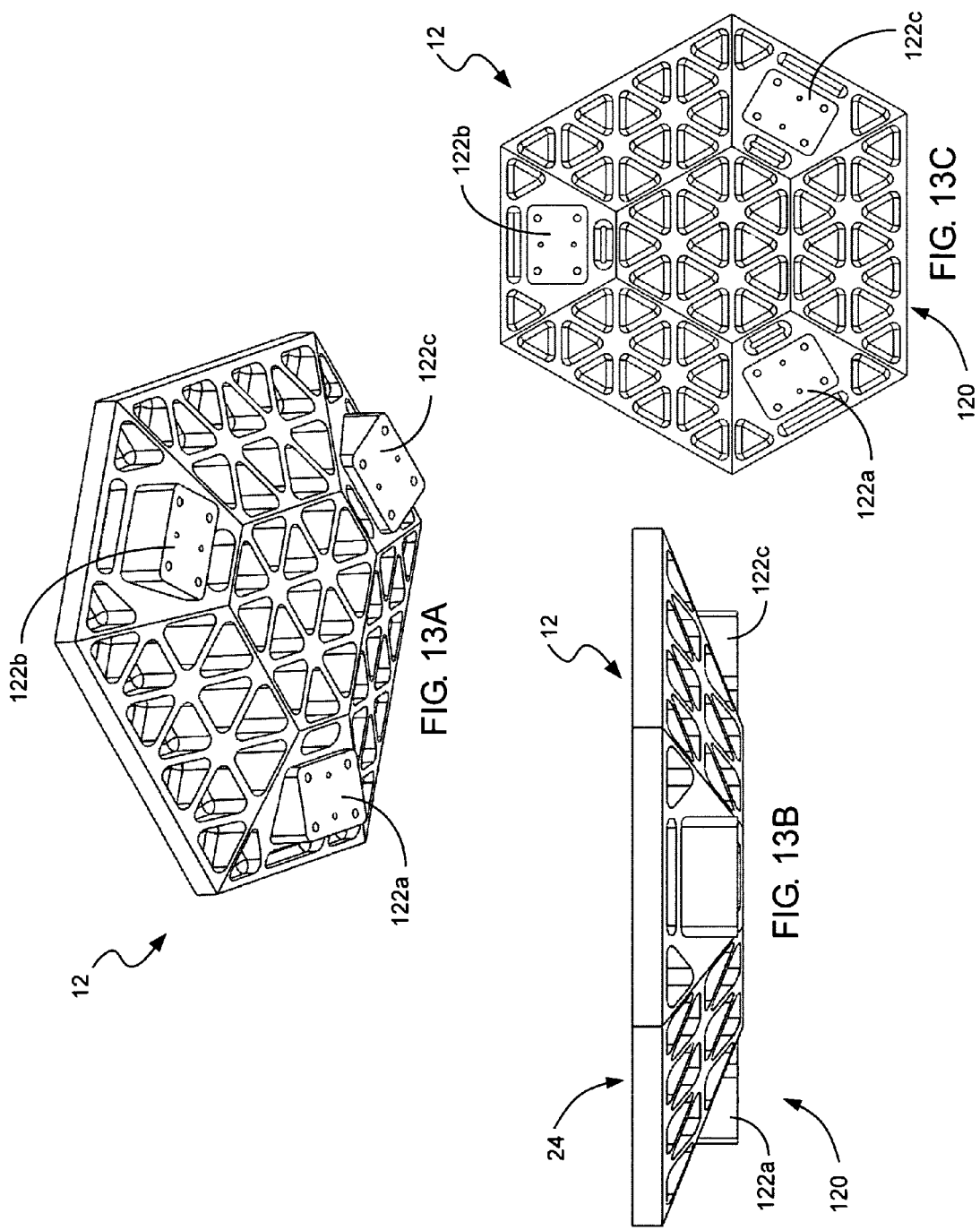

FIGS. 13A-C and 14 are diagrams of the top plate 12 according to various embodiments of the present invention. FIG. 13A is a perspective view of the underside 120 of the top plate 12 according to various embodiments; FIG. 13B is a cross-sectional side view of the top plate 12 according to various embodiments; and FIG. 13C is plan view of the underside 120 of the top plate 12 according to various embodiments. The top plate 12 may define an upper, preferably flat, surface 124 that, as shown in these figures, defines a polygon, such as a hexagon. Also, as shown in the illustrated embodiment, the top plate 12 need not be symmetrical. The underside 120 of the top plate 12 may define three (3) upper bipod block connection surfaces 122a-c. Each one of the three (3) upper bipod blocks 22a-c may connect to a corresponding one of the three (3) upper bipod block connection surfaces 122a-c.

Figure 14:
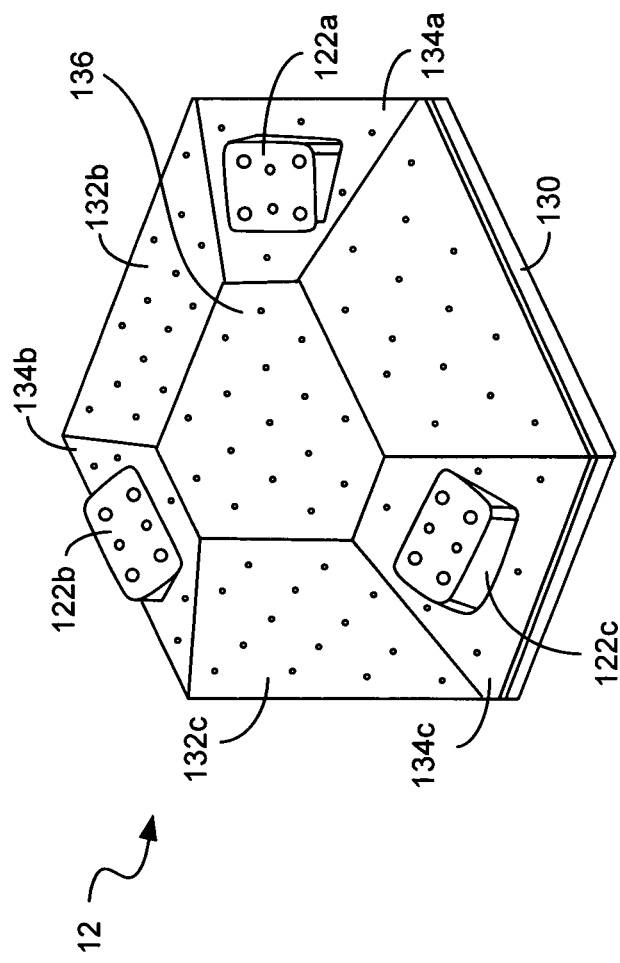

As shown in FIG. 14, the top plate 12 may be fabricated from multiple pieces, including an upper plate 130 and several plates making up the lower surface 120 of the top plate 12. The multiple plates making up the lower surface 120 may comprise: three large plates 132a-c, three small plates 134a-c, and a middle plate 136. The upper bipod block connection surfaces 122a-c may be positioned on the small plates 134a-c respectively. The various pieces may be made from metal or hard plastic, for example. The pieces may be connected by epoxy, for example.

Figure 15:
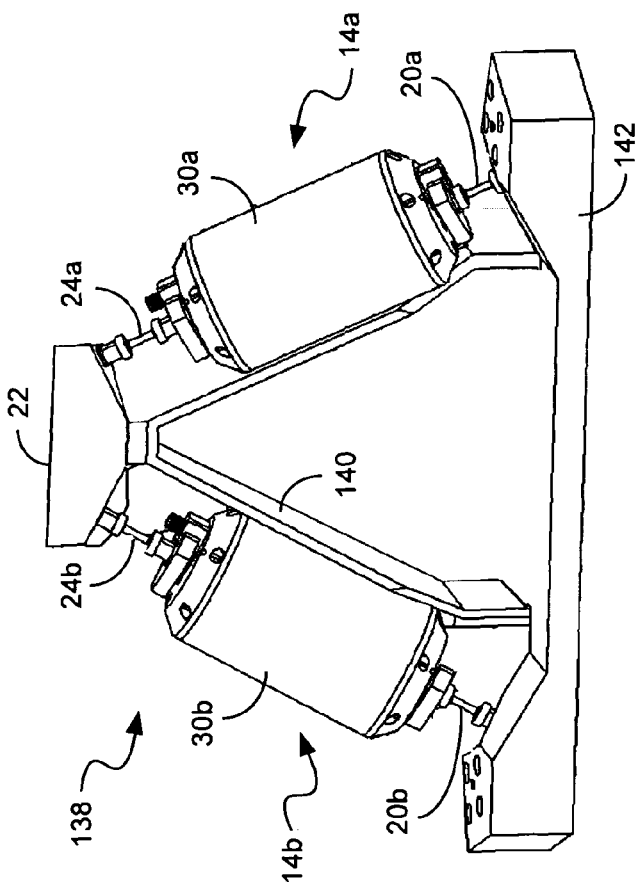

The following provides instructions for assembling the shaker 10 according to various embodiments. First, the three bipod assemblies may be constructed. An example of a completed bipod assembly 138 is shown in FIG. 15. Each bipod assembly 138 may include two strut assemblies 14a-b, so for six-strut assembly shaker, three such bipods may be used. The following describes how each of the bipod assemblies 138 may be constructed. First, the upper and lower flexures 24, 20 are connected to each of the VCAs 30a-b. The flexures 24, 20 may be connected to the VCAs 30a-b by screwing the flexures 24, 20 into end of the VCAs 30. Also, adapters 44, 52 may be used. Next, the position sensor 70 may be threaded into the VCAs 30. The positions sensors 70 are then calibrated.

Next, the upper bipod block 22 may be connected (e.g., bolted) to the top of a bipod A-frame 140. Next, the top ends of the strut assemblies 14 may be inserted into the respective bores 104 of the upper bipod block 22 and tightened with nuts respectively. Next, one of the bases 18a (not shown in FIG. 15) is connected to the lower end (lower flexure 20) of one of the VCAs 30a. Next, one end of a baseframe 142 may be connected (e.g., bolted) to the base 18a that was connected to the VCA 30a. Next, the second base 18b (not shown in FIG. 15) is connected to the second VCA 30b and then the other end of the baseframe 142 is connected to the second base 18b. Next, the baseframe 142 is connected to the bipod A-frame 140. The steps may be repeated to construct the other bipod assemblies 138.

Figure 16:
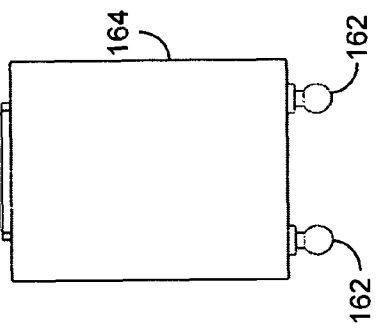

In some embodiments, emergency stop columns may be employed. For example, in some embodiments, three emergency stop columns may be used. The following describes embodiments of how to assemble one of the emergency stop columns. An example of an assembled emergency stop column 160 is shown in FIG. 16. First, a number (at least three) of tooling balls 162 are inserted into the base of the hardstop base 164. (Only two tooling balls 162 are visible in FIG. 16.) In addition, one tooling ball 166 may be inserted into the top of hardstop top 168. Next, a rotary platform lab jack 170 may be connected to the top of the hardstop base 164 and the bottom of the hardstop top 168. The height of the rotary platform lab jack 170 may then be adjusted as desired. The other emergency stop columns 160 may be assembled in a similar manner.

Figure 17:
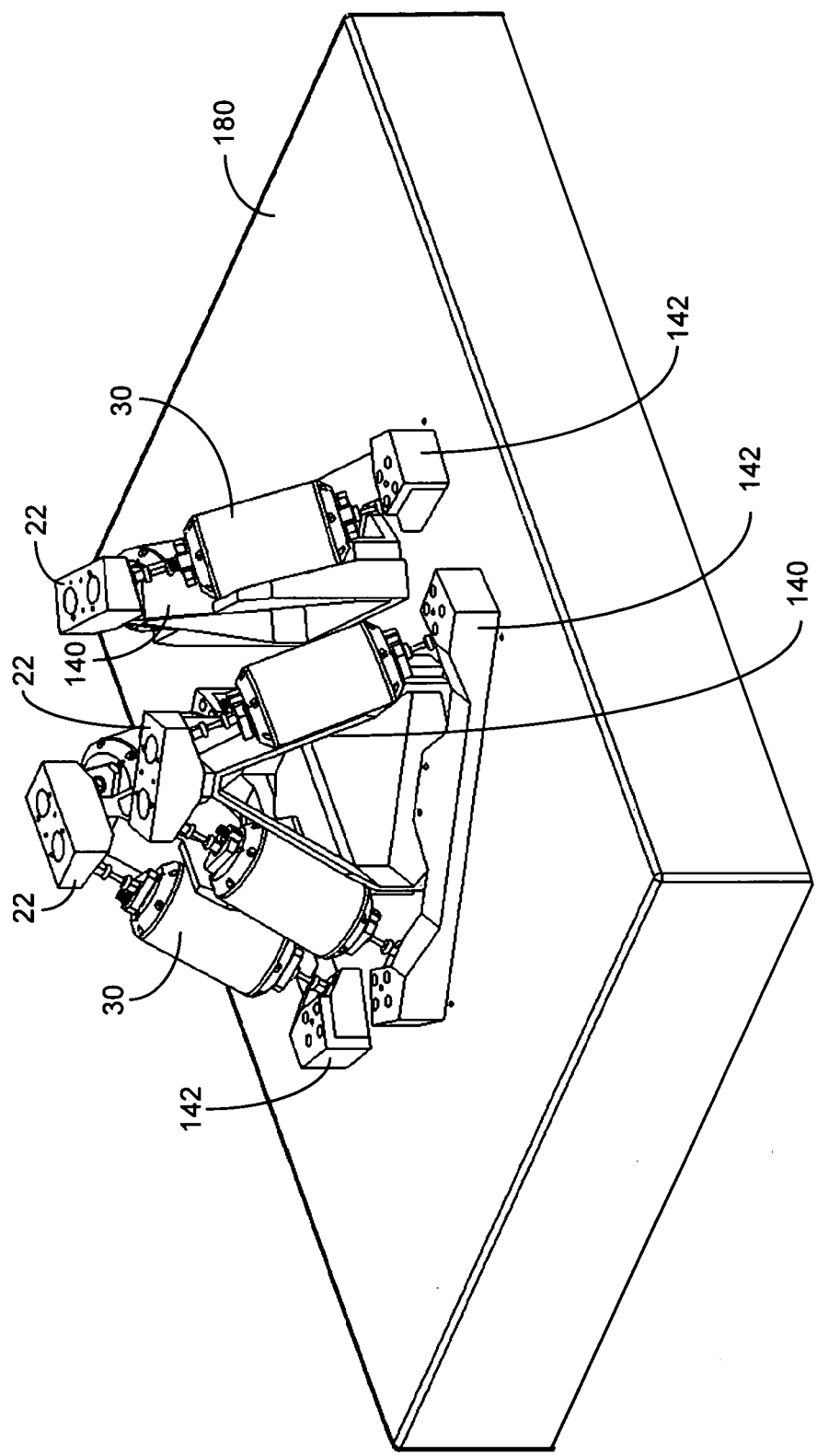
Figure 18:
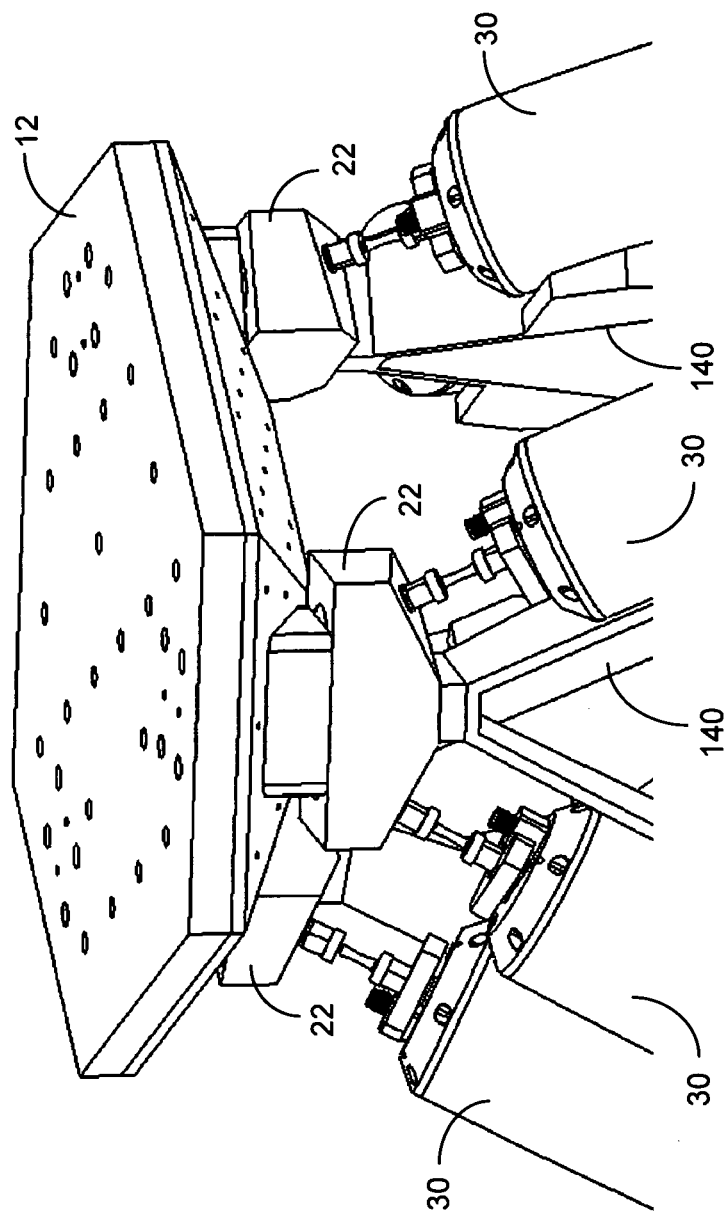
Figure 19:
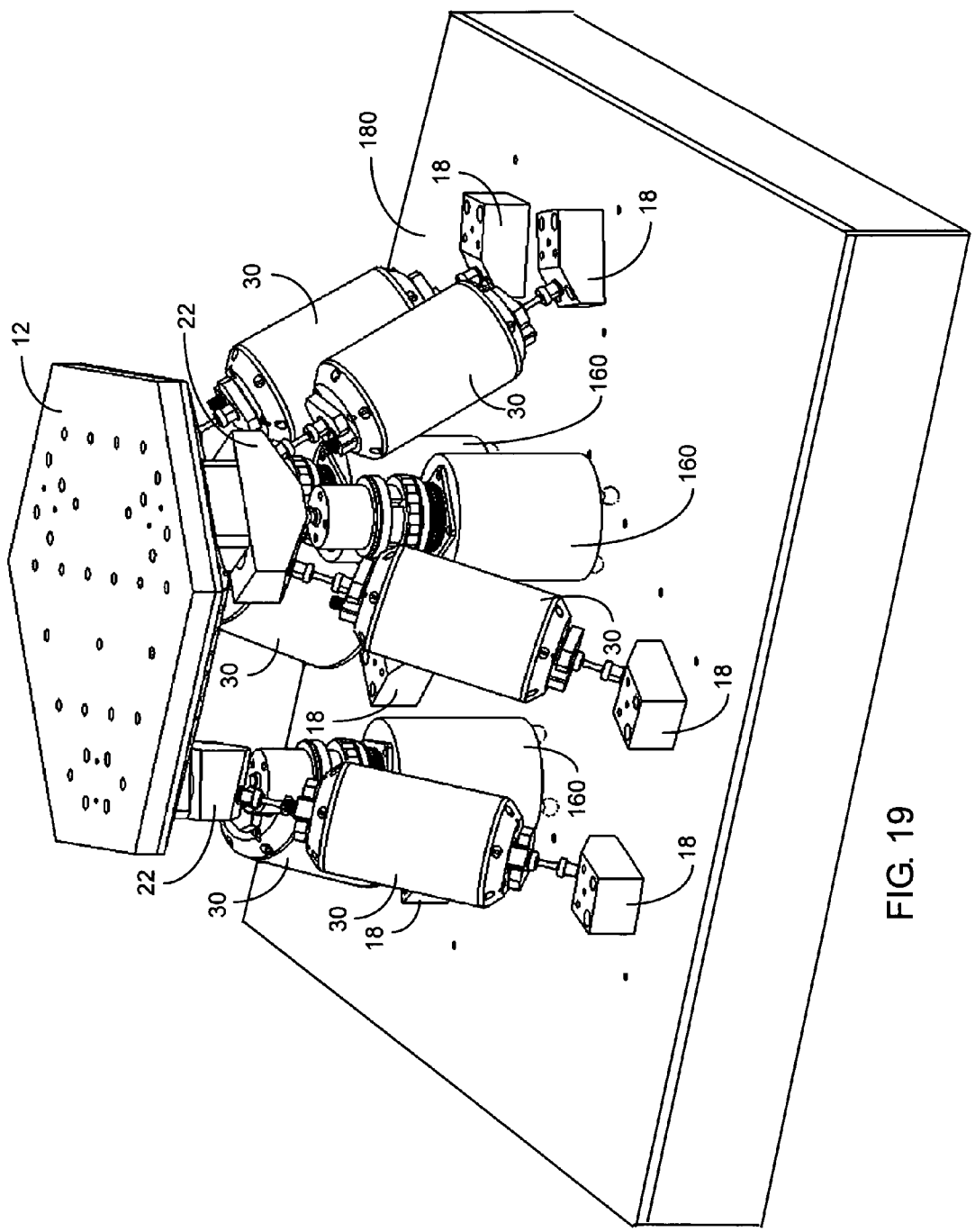

With the bipod assemblies 138 and the emergency stop columns 160 assembled, the final assembly for the shaker 10 may be performed. First, the bipod assemblies 138 may be placed on a base platform 180, as shown in the example of FIG. 17, and the bases 18 of the bipod assemblies 138 may be bolted to the base platform 180. Next, the top plate 12 may be placed on and bolted to the three upper bipod blocks 22, as shown in FIG. 18. Next, the bolts connecting the three upper bipod blocks 22 to the bipod A-frames 140 may be removed, and the bolts connecting the bases 18 to the baseframes 142 may be removed. Next, the baseframes 142 may be removed from the base platform 180. Next, the bipod A-frames 140 may be removed by, for example, slowly sliding them under the center of the top plate 12, rotating them, and then sliding them out through the strut assemblies 14. Next, the three emergency stop columns 160 may be slid under the three upper bipod blocks 22, leaving a small clearance (e.g., 0.05 inches) between the tops of the emergency stop columns 160 and the bottoms of the upper bipod blocks 22, resulting in an assembly with emergency stops as shown in FIG. 19.

In various embodiments, the shaker 10 may be used to test the performance of a gyroscope, e.g., a FOG, in response to vibration imparted to the gyroscope by the motion of the shaker 10. For example, in various embodiments, a FOG under test may be positioned on the shaker top plate 12. The FOG may comprise a very long fiber optic fiber (e.g., up to 2 km in length) wound in a coil. The coil may have a diameter of eight to ten inches, for example. Two light beams may travel along the fiber in opposite directions. Due to the Sagnac effect, the beam travelling against the rotation of the coil experiences a slightly shorter path than the other beam. The resulting phase shift affects how the beams interfere with each other when they are combined. The intensity of the combined beam then depends on the angular frequency of the device. The FOG may be vibrated by movement of the shaker top plate 12, caused by actuation of the strut assemblies 14, along a controlled, precise movement sequence to test the response of the FOG in response to such controlled, precise movement sequence. The vibration movement may simulate spacecraft motion. The performance of the FOG may be measured in response to such vibration to determine the effect of the vibration on the performance of the FOG. This is done by looking for shifts in the bias of the FOG output. This can be done by inspection of the data. Such tell tale shifts are indicators of the onset of the low level vibe phenomenon seen in FOGs.

In various embodiments, therefore, the present invention is directed to a shaker that comprises: a programmable control circuit; a plate; at least one base assembly; and a plurality of strut assemblies connected between the plate and the at least one base assembly. Each strut assembly comprises: an electromagnetic actuator for extending and contracting the strut assembly along a linear stroke length based on a control signal from the programmable control circuit; a non-contact position sensor for sensing a stroke position of the strut assembly along the linear stroke length, wherein an output of the non-contact position sensor is input to the programmable control circuit; an upper, bendable flexure that connects the strut assembly to the plate; and a lower, bendable flexure that connects the strut assembly to the at least one base assembly. The programmable control circuit has an output connected to each of the electromagnetic actuators of the plurality of strut assemblies for individually controlling extension and contraction of the plurality of strut assemblies along the linear stroke length based on the outputs from the non-contact position sensors of the plurality of strut assemblies so that the plurality of strut assemblies individually follow a desired motion path, wherein the programmable control circuit has a control bandwidth for the strut assemblies that is 1000 Hz or greater.

In various implementations, six (6) strut assemblies are used. Also, voice coil actuators may be used for the electromagnetic actuators. Also, the non-contact position sensors may comprise eddy current position sensors, optical encoders, or capacitive sensors, for example. In addition, the upper and/or lower flexures may comprise a thin, metallic stem portion having a radius of 0.20 inches or less. The upper and/or lower flexures may also comprise a parabolic profile. The plate may comprise an upper flat surface and a lower surface connected to the plurality of strut assemblies.

In other embodiments, the present invention is directed to a method of testing a fiber optic gyroscope. The method may comprise the steps of vibrating the fiber optic gyroscope with a shaker while the fiber optic gyroscope is positioned on a platform of the shaker and measuring performance of the fiber optic gyroscope in response to the vibrating. The shaker used for the testing may be as described above.

It should be appreciated that for conciseness and clarity, spatial terms such as "vertical," "horizontal," "up," and "down" may be used herein with respect to the illustrated embodiments. However, the disclose devices may be used in many orientations and positions, and these terms are not intended to be limiting and absolute.

Although the various embodiments of the devices have been described herein in connection with certain disclosed embodiments, many modifications, and variations to those embodiments may be implemented. Also, where materials are disclosed for certain components, other materials may be used. Furthermore, according to various embodiments, a single component may be replaced by multiple components, and multiple components may be replaced by a single component, to perform a given function or functions. The foregoing description and following claims are intended to cover all such modification and variations.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A shaker comprising:
    a programmable control circuit;
    a plate;
    at least one base assembly; and
    a plurality of strut assemblies connected between the plate and the at least one base assembly, wherein each strut assembly comprises:
        an electromagnetic actuator for extending and contracting the strut assembly along a linear stroke length based on a control signal from the programmable control circuit;
        a non-contact position sensor for sensing a stroke position of the strut assembly along the linear stroke length, wherein an output of the non-contact position sensor is input to the programmable control circuit;
        an upper, bendable flexure comprising a first end portion that is non-pivotably connected to the strut assembly and a second end portion that is non-pivotably connected to the plate, and wherein the upper, bendable flexure further comprise a thick cylindrical portion and a thin essentially cylindrical stem portion that is coaxial with the thick cylindrical portion, wherein the thin cylindrical stem portion is bendable due to extension of the strut assembly connected to the upper, bendable flexure;
        a lower, bendable flexure comprising a first end portion that is non-pivotably connected to the strut assembly and a second end portion that is non-pivotably connected to the at least one base assembly, and wherein the lower, bendable flexure further comprise a thick cylindrical portion and a thin essentially cylindrical stem portion that is coaxial with the lower thick cylindrical portion, wherein the lower thin cylindrical stem portion is bendable due to extension of the strut assembly connected to the lower, bendable flexure;
    wherein the programmable control circuit has an output connected to each of the electromagnetic actuators of the plurality of strut assemblies for individually controlling extension and contraction of the plurality of strut assemblies along the respective linear stroke length based on the outputs from the non-contact position sensors of the plurality of strut assemblies so that the plurality of strut assemblies individually follow a desired motion path with six degrees of freedom, wherein the programmable control circuit has a control bandwidth for the strut assemblies that is 1000 Hz or greater.

2. The shaker of claim 1, wherein the plurality of strut assemblies comprises six (6) strut assemblies.

3. The shaker of claim 1, wherein each electromagnetic actuator comprises a voice coil actuator.

4. The shaker of claim 1, wherein each non-contact position sensor comprises an eddy current position sensor.

5. The shaker of claim 1, wherein each non-contact position sensor comprises an optical encoder.

6. The shaker of claim 1, wherein each non-contact position sensor comprises a capacitive sensor.

7. The shaker of claim 1, wherein:
    the thin cylindrical stem portion of the upper, bendable flexure comprises a thin, metallic stem portion having a radius of 0.20 inches or less; and
    the thin cylindrical stem portion of the lower, bendable flexure comprises a thin, metallic stem portion having a radius of 0.20 inches or less.

8. The shaker of claim 7, wherein the thin cylindrical stem portion of the upper, bendable flexure comprises a parabolic profile.

9. The shaker of claim 8, wherein the thin cylindrical stem portion of the lower, bendable flexure comprises a parabolic profile.

10. The shaker of claim 1, wherein the linear stroke length of each electromagnetic actuator is 0.10 inches or less.

11. The shaker of claim 1, wherein the plate comprises:
    an upper flat surface; and
    a lower surface, wherein the lower surface is connected to the plurality of strut assemblies.

12. A shaker for shaking an object according to a desired object motion sequence, the shaker comprising:
    a programmable control circuit;
    a top plate having an upper, flat surface and a lower surface, wherein the object is positionable on the upper, flat surface;
    six base assemblies; and
    six strut assemblies connected to the lower surface of the top plate, wherein each strut assembly comprises:
        an electromagnetic actuator for extending and contracting the strut assembly along a linear stroke length based on a control signal from the programmable control circuit;
        a non-contact position sensor for sensing a stroke position of the strut assembly along the linear stroke length, wherein an output of the non-contact position sensor is input to the programmable control circuit;
        an upper, bendable flexure comprising a first end portion that is non-pivotably connected to the strut assembly and a second end portion that is non-pivotably connected to the plate, and wherein the upper, bendable flexure further comprise a thick cylindrical portion and a thin essentially cylindrical stem portion that is coaxial with the thick cylindrical portion, wherein the thin cylindrical stem portion is bendable due to extension of the strut assembly connected to the upper, bendable flexure;
        a lower, bendable flexure comprising a first end portion that is non-pivotably connected to the strut assembly and a second end portion that is non-pivotably connected to one base assembly, and wherein the lower, bendable flexure further comprise a thick cylindrical portion and a thin essentially cylindrical stem portion that is coaxial with the lower thick cylindrical portion, wherein the lower thin cylindrical stem portion is bendable due to extension of the strut assembly connected to the lower, bendable flexure;
    wherein the programmable control circuit has an output connected to each of the electromagnetic actuators of the strut assemblies for individually controlling extension and contraction of the strut assemblies along the respective linear stroke length based on the outputs from the non-contact position sensors of the strut assemblies so that the strut assemblies individually follow a desired motion path with six degrees of freedom, thereby shaking the object according to the desired object motion sequence, wherein the programmable control circuit has a control bandwidth for the strut assemblies that is 1000 Hz or greater.

13. The shaker of claim 12, wherein each electromagnetic actuator comprises a voice coil actuator with a linear stroke length that is 0.10 inches or less.

14. The shaker of claim 13, wherein each non-contact position sensor comprises an eddy current position sensor.

15. The shaker of claim 13, wherein each non-contact position sensor comprises an optical encoder.

16. The shaker of claim 13, wherein each non-contact position sensor comprises a capacitive sensor.

17. The shaker of claim 13, wherein:
the thin cylindrical stem portion of the upper, bendable flexure comprises a thin, metallic stem portion having a radius of 0.20 inches or less, and wherein the thin stem portion of the upper, bendable flexure comprises a parabolic profile; and
the thin cylindrical stem portion of the lower, bendable flexure comprises a thin, metallic stem portion having a radius of 0.20 inches or less, and wherein the thin stem portion of the lower, bendable flexure comprises a parabolic profile.

18. A method of testing a fiber optic gyroscope, comprising:
vibrating the fiber optic gyroscope with a shaker while the fiber optic gyroscope is positioned on a platform of the shaker, the shaker comprising:
a programmable control circuit;
a top plate on which the fiber optic gyroscope is positioned;
at least one base assembly; and
a plurality of strut assemblies connected between the top plate and the at least one base assembly, wherein each strut assembly comprises:
an electromagnetic actuator for extending and contracting the strut assembly along a linear stroke length based on a control signal from the programmable control circuit;
a non-contact position sensor for sensing a stroke position of the strut assembly along the linear stroke length, wherein an output of the non-contact position sensor is input to the programmable control circuit;
an upper, bendable flexure comprising a first end portion that is non-pivotably connected to the strut assembly and a second end portion that is non-pivotably connected to the top plate, and wherein the upper, bendable flexure further comprise a thick cylindrical portion and a thin essentially cylindrical stem portion that is coaxial with the thick cylindrical portion, wherein the thin cylindrical stem portion is bendable due to extension of the strut assembly connected to the upper, bendable flexure;
a lower, bendable flexure comprising a first end portion that is non-pivotably connected to the strut assembly and a second end portion that is non-pivotably connected the at least one base assembly, and wherein the lower, bendable flexure further comprise a thick cylindrical portion and a thin essentially cylindrical stem portion that is coaxial with the lower thick cylindrical portion, wherein the lower thin cylindrical stem portion is bendable due to extension of the strut assembly connected to the lower, bendable flexure;
wherein the programmable control circuit has an output connected to each of the electromagnetic actuators of the plurality of strut assemblies for individually controlling extension and contraction of the plurality of strut assemblies along the respective linear stroke length based on the outputs from the non-contact position sensors of the plurality of strut assemblies so that the plurality of strut assemblies individually follow a desired motion path with six degrees of freedom, wherein the programmable control circuit has a control bandwidth for the strut assemblies that is 1000 Hz or greater; and
measuring performance of the fiber optic gyroscope in response to the vibrating.

19. The method of claim 18, wherein:
the plurality of strut assemblies comprises six (6) strut assemblies; and
each electromagnetic actuator comprises a voice coil actuator.

20. The method of claim 19, wherein each non-contact position sensor comprises a differential eddy current position sensor.

* * * * *